United States Patent [19]

Crow et al.

[11] 3,857,913
[45] Dec. 31, 1974

[54] METHOD FOR THE MANUFACTURE OF CARBON FOAM

[75] Inventors: William T. Crow, Pittsburgh, Pa.; Arthur E. Sands, Oak Ridge; Michael E. Scrivner, Knoxville, both of Tenn.

[73] Assignee: The United States of America as represented by the United States Atomic Energy Commission, Washington, D.C.

[22] Filed: Oct. 13, 1972

[21] Appl. No.: 298,717

Related U.S. Application Data

[63] Continuation of Ser. No. 868,138, Oct. 21, 1969, abandoned.

[52] U.S. Cl. ............... 264/29, 260/2.5 BD, 264/51
[51] Int. Cl. ........................................... C01b 31/00
[58] Field of Search ............ 264/29, 51; 260/2.5 A, 260/2.5 BD

[56] References Cited
UNITED STATES PATENTS

| | | | |
|---|---|---|---|
| 2,879,233 | 3/1959 | Pace | 260/2.5 |
| 2,981,700 | 4/1961 | Parker | 260/2.5 |
| 3,141,865 | 7/1964 | McEvoy | 260/2.5 |
| 3,302,999 | 2/1967 | Mitchell | 264/29 |
| 3,314,901 | 4/1967 | Daumiller et al. | 260/2.5 |
| 3,345,440 | 10/1967 | Googin et al. | 264/29 |
| 3,574,548 | 4/1971 | Sands et al. | 260/2.5 |

Primary Examiner—Donald J. Arnold
Attorney, Agent, or Firm—John A. Horan; David S. Zachrey; Earl L. Larcher

[57] ABSTRACT

Carbon foam is produced by admixing a thixotropic binder of partially polymerized furfuryl alcohol containing less than 12 mole per cent free alcohol with water and a two-component urethane system comprising a resin of polyhydric alcohol and diisocyanate for providing a structure of foam which is then cured and subsequentially heated to a temperature sufficient to thermally decompose the urethane and carbonize the binder. The preparation of a multi-batch quantity of the above admixture is accomplished by premixing the foam forming components except for the diisocyanate into a homogeneous premix while shearing the binder to reduce the viscosity of the premix to facilitate the handling and mixing thereof and heating this premix during the preparation thereof to a temperature in the range of about 35° to 40°C. to inhibit coagulation. A selected quantity of the premix is then mixed with the diisocyanate component and poured into a suitable mold.

3 Claims, 1 Drawing Figure

PATENTED DEC 31 1974
3,857,913
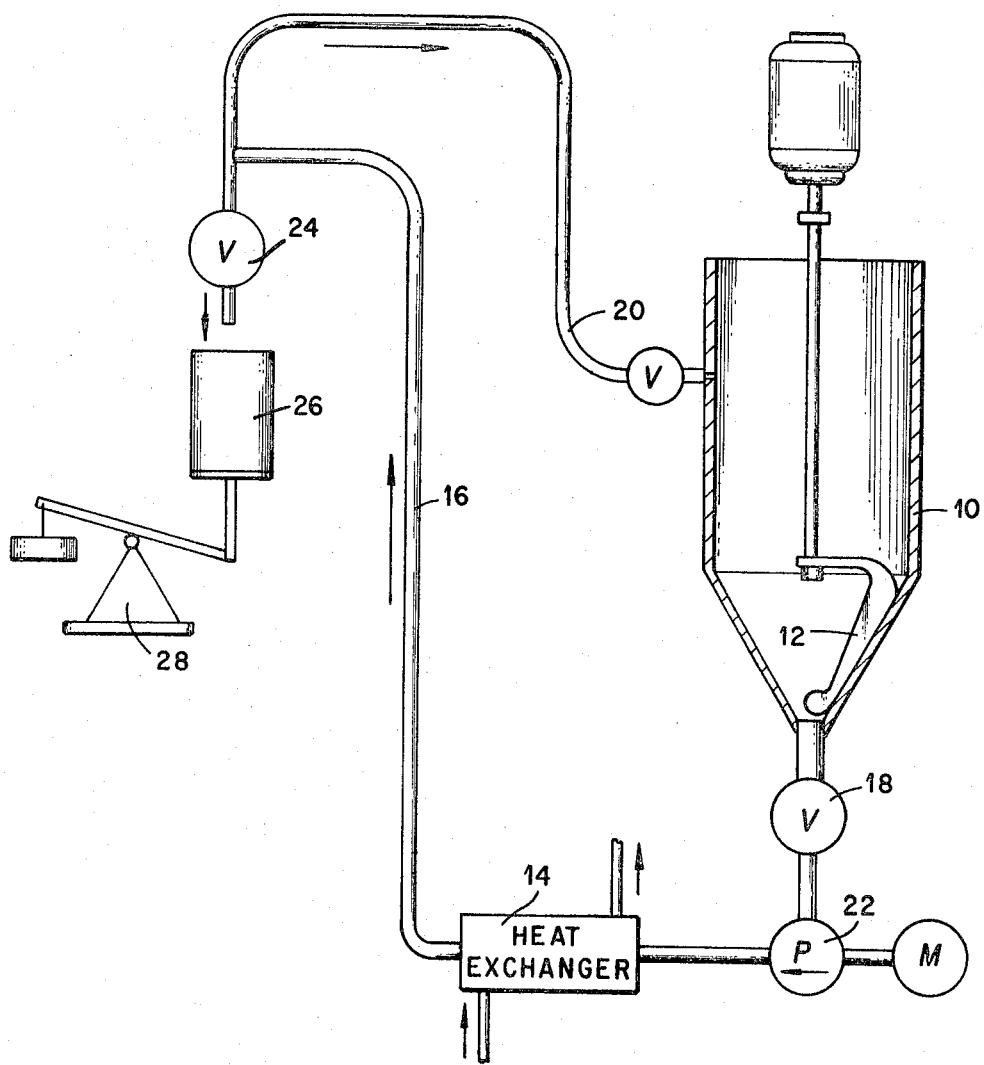
INVENTORS
William T. Crow
Arthur E. Sands
Michael E. Scrivner
BY
ATTORNEY.

METHOD FOR THE MANUFACTURE OF CARBON FOAM

This is a continuation of application Ser. No. 868,138, filed Oct 21, 1969 and now abandoned.

The present invention relates generally to the preparation of a cellular carbonaceous product, and more particularly to the preparation of multi-batch quantities of materials employed in the production of the carbonaceous product. This invention was made in the course of, or under, a contract with the U.S. Atomic Energy Commission.

Carbon foam, because of its high mechanical strength and low bulk density, has proven to be useful in many structural applications, particularly in high temperature environments in the presence of high or changing relative humidity. The methods and materials employed in the manufacture of carbon foam are many and varied. Satisfactory results have been achieved by employing the materials and method described in assignee's copending U.S. Pat. application, Ser. No. 849,204, filed on Aug. 11, 1969 and now U.S. Pat. No. 3,574,548, and entitled "Rigid Carbon Foam and Process for Manufacturing Same." Carbon foam is produced in accordance with this teaching by admixing a thermosetting resin binder of partially polymerized furfuryl alcohol containing less than 12 mole per cent of the alcohol monomer or free alcohol with water and a two-component urethane system. This mixture is then poured into a suitable mold, cured, and subsequently heated to a temperature sufficient to thermally decompose the urethane and carbonize the binder. The two-component urethane system preferably comprises a polyhydric alcohol resin ("R" component) and tolylene diisocyanate ("T" component) with the water reacting with the isocyanate to produce the gas (carbon dioxide) necessary for foaming the mixture. The T and R components react exothermally to provide a cross-linked structure which increases the strength of the carbonized product.

To promote the urethane reaction by enhancing $CO_2$ evolution and cross-linking of the urethane constituents, a catalyst such as N-methylmorpholine is used. Also, a surfactant such as silicone or any other suitable nonionic material may be employed in the mixture for the purpose of regulating or stabilizing to some extent the size of the cells in the foam.

The mixture of ingredients utilized in the production of the carbon foam is prepared by mixing the urethane R component with the thermosetting resin binder and water. The catalyst and the cell stabilizer are added to this mixture and then, after stirring for approximately 5 minutes or until the ingredients are adequately blended, the T component of the urethane system is added to the mixture. Upon stirring the complete foam producing mixture for about 1 to 4 minutes, depending on the reactivity of the mixture, it is poured into a mold of a suitable configuration before the foaming action starts or is of any significance. The particular quantities of the foam producing components provide the basic control over the quality and type of foam being produced. However, producing a number of foam castings by preparing a desired quantity of the foam producing components for each casting introduces several process variations which result in significant differences in the physical properties of the carbon foam structures. For example, the method of mixing, weighing errors, stirring times, ingredient temperatures, sequence of adding ingredients, and other process variables affect the properties of the foamed structure. Also, in a single-batch operation, the foam ingredients prior to and after the addition of the isocyanate must be thoroughly blended, with precautions being taken to insure that the ingredients are not over- or under-mixed since excessive mixing may cause the foam to split, while under-mixing may cause the foam cells to be closed or coarse.

Another mechanism responsible for process and product variations is due to a coagulating condition occurring in the mixture which causes the cells in the foam to elongate and produce marked effects in the perpendicular and parallel strength properties of the foam, with such effects varying with differing degrees of coagulation. The deleterious effects of the coagulation on the properties of the foam occur even though the coagulation disappears when the isocyanate is added to the mixture and the foaming starts. It has been found that a reaction occurring between the water and the R component of the urethane system causes the coagulation, with the amount or extent of coagulation increasing with increasing mixing times and/or increasing quantities of water. It is surmised that the water-produced coagulation in the one-batch operations increases the reaction rate which, in turn, increases the rate of carbon dioxide production. This increased reaction rate results in elongated cells and poor uniformity of cell structure. However, since the water is a necessary constituent in the foam producing formulation and since it must be thoroughly mixed with the other ingredients, it is somewhat imperative that the water be well blended with the other ingredients prior to adding the isocyanate, thus precluding the addition of the water to the mixture with or after the addition of the isocyanate. In order to avoid problems due to coagulation it was heretofore necessary to use the foam mixture, less the isocyanate, within a relatively short period of time after effecting a blending of the ingredients.

The partially polymerized furfuryl alcohol employed as the binder in the foam preparation necessarily contains less than 12 mole per cent (preferably 5–10 per cent) of the alcohol monomer in order to prevent the occurrence of deleterious reactivity of the binder during the reaction between the urethane components which causes large, irregular cells, voids, cracks, and the like. The viscosity of the binder is in the range of about 10,000 to 14,000 centipoises and has a hydroxyl number in the range of about 100 to 140. With the binder at this relatively high level of viscosity the blending of the binder with the other foam ingredients is rather difficult, time consuming, and the degree of homogeneity is not consistent from batch to batch. However, dilution of the binder with a solvent thereof, e.g., furfuryl alcohol, to facilitate mixing and subsequent handling is not desirable for the aforementioned reasons.

A principal object of the present invention is to obviate or substantially minimize at least some of the aforementioned and other problems encountered in the production of carbon foam by providing a new and improved method of preparing a mixture of the foam forming ingredients except for the isocyanate that is representative of a quantity sufficient to effect the preparation of a plurality of carbon foam castings.

Another object of the present invention is to provide a method of preparing a multi-batch premix of a urethane foam producing mixture comprising a thermosetting resin, water, the R component of the urethane foam forming system, a catalyst, and a cell stabilizer, with this mixture being storeable for relatively extensive periods without suffering the aforementioned deleterious effects due to coagulation.

A further object of the present invention is to reduce the viscosity of the partially polymerized furfuryl alcohol binder by shearing and without dilution to a viscosity in a range sufficiently low to facilitate mixing, handling, and the preparation of carbon foam products exhibiting uniform properties and consistent reproducibility.

Other and further objects of the invention will be obvious upon an understanding of the illustrative description set forth below, or will be indicated in the appended claims, and various advantages not referred to herein will occur to one skilled in the art upon employment of the invention in practice.

For the purpose of describing the method of the present invention an embodiment of apparatus for performing the method is illustrated. However, the embodiment illustrated is not intended to be exhaustive or to limit the invention to the precise foam of apparatus disclosed. It is chosen and described in order to best explain the principles of the invention and their application in practical use to thereby enable others skilled in the art to best utilize the invention in various embodiments and modifications as are best adapted to the particular use contemplated.

In the accompanying drawing:

The FIGURE is a somewhat diagrammatic view of the apparatus employed for the preparation of the foam formulation in multi-batch quantities in accordance with the method of the present invention.

In the manufacture of cellular carbonaceous products the ingredients utilized for producing the foam are prepared by employing the two-step mixing operation briefly mentioned above and described in detail in assignee's aforementioned patent application. During this mixing operation the temperature of the mixture before the addition of the isocyanate was maintained at about room temperature, i.e., in a temperature range of about 20° to 30°C. It was found that, while the premix, i.e., the portion of the mixture before the isocyanate is added, is in the aforementioned temperature range, the deleterious coagulation occurs, but that this condition did not occur when the temperature of the premix was increased at least about 5°C. over that previously employed. Thus, by maintaining the temperature of the premix in the vessel 10 in a range of about 35° to 40°C., or slightly higher if desired, the premix may be stored for periods of 3 days or more without suffering changes in the premix due to coagulation.

As shown in the drawing, the premix is prepared by combining in the container or vessel 10 the partially polymerized furfuryl alcohol binder containing less than 12 mole per cent of the alcohol monomer with the R component of the urethane system, water, a catalyst, and a surfactant. The ratio of the binder to urethane system as well as the preferred quantities of water, catalyst, and stabilizer for providing carbon foam of particular desired properties are set forth in detail in assignee's aforementioned patent application. With the desired quantities of the foam ingredients, except for the T component of the urethane system, in the container 10 the motor driven mechanical impeller or agitator 12 is employed to thoroughly mix the ingredients into a homogeneous blend. During this mixing operation the viscosity of the mixture is such that mechanical energy provided by the agitator 12 and the pump 22 is converted to heat energy which, in turn, increases the temperature of the mixture. The heating of the mixture by the agitator and the pump is sufficient to increase the temperature of the premix from about room temperature up to a preferred temperature in the range of about 35° to 40°C. for inhibiting coagulation as described above. In order to maintain the temperature of the premix within this preferred range the premix is continually circulated through a heat exchanger 14 cooled by water or any other suitable coolant via a conduit system 16 and valves 18 and 20 which may be suitably controlled to regulate the quantity of premix being passed through the heat exchanger and returned to the container 10. Also, the quantity and temperature of coolant employed in the heat exchanger may be regulated by any suitable conventional mechanism. A pump 22, preferably of the gear type, is disposed in the conduit system 16 and used to circulate the premix.

As briefly mentioned above, the binder of partially polymerized furfuryl alcohol contains less than 12 mole per cent of the alcohol monomer and has a viscosity in the range of about 10,000 to 14,000 centipoises. With the binder at this viscosity the blending of the ingredients in the container to achieve homogeneity is somewhat difficult and, unless a homogeneous premix is used in the preparation of the foam, significant variations in the product occur. Further, with the premix at a relatively high viscosity due to the presence of the binder in binder-to-urethane ratios of 0.45–2.2 to 1, the blending of the T component of the urethane system with the premix is at best marginal since only a relatively short time is available for completing such blending before the foaming reaction begins. Decreasing the viscosity by diluting the binder with furfuryl alcohol so as to have more than 12 mole per cent free furfuryl alcohol in the binder does not provide a desirable solution. The excess alcohol in the binder, i.e., the alcohol content over the 12 mole per cent maximum, effects deleterious results in the carbon foam product for reasons described in detail in the aforementioned patent application.

Applicants have discovered a unique solution for decreasing the viscosity of the binder, without dilution, to a viscosity in a range which facilitates the blending of the foam ingredients to a homogeneous state. It has been found that the binder of partially polymerized furfuryl alcohol exhibits thixotropic-like properties. Thus, by continuously subjecting the binder to the intense tearing action of the gear-type pump 22 as well as the less intense forces of the agitator 12, the binder undergoes a shearing action which separates the molecules in the binder to, in effect, further liquefy the binder and thereby reduce its viscosity. Normally, the premix ingredients are blended and circulated for a period of about 45 minutes to achieve homogeneity, a coagulation retarding temperature in the range of about 35° to 40°C., and a reduction in viscosity from the abovementioned range of about 10,000 to 14,000 centipoises to a range of about 4,000 to 6,000 centipoises. By continuously stirring and circulating the premix the desirable properties may be retained for a duration of about 3 days or longer without suffering deleterious effects. On the other hand, once the shearing of the binder ceases, the viscosity of the latter gradually returns to its original pre-shearing viscosity.

When it is desired to prepare a carbonaceous structure, a selected quantity of the premix is withdrawn from the blending system through valve 24 into a suitable vessel such as generally indicated at 26. After the selected quantity of the premix is withdrawn, as determined by any suitable means such as scales broadly shown at 28, a predetermined quantity of the isocyanate or T component of the urethane system is added to the premix in the vessel and stirred for a duration of less than 1 to about 4 minutes depending upon the reactivity of the mixture. The premix discharged into the vessel 26 is cooled by the heat exchanger 14 preferably to a temperature in the range of about 25° to 35°C. to prevent an excessively rapid foaming action from taking place when the isocyanate is added to the premix and to reduce cross-fracturing or splitting of the green castings.

In order to provide a more facile understanding of the present invention, a typical example of employing a multi-batch premix for the preparation of carbonaceous products is set forth below.

EXAMPLE

A foam body which, when carbonized, provides a carbonaceous foam structure of a density of approximately 0.05 gm/cc is prepared by employing the following steps:

The vessel 10 containing the mechanically driven agitator 12 is loaded with 95,400 grams of partially polymerized furfuryl alcohol, 70,050 grams of the polyhydric alcohol resin, 3,050 grams of silicon for cell size stabilization, 350 grams of the catalyst N-methylmorpholine, and 6,300 grams of water. These chemical ingredients are blended thoroughly in about 45 minutes into a homogeneous premix with the aid of the mechanical mixer in the vessel and the gear-type pump 22, which circulates the premix through the heat exchanger 14. The heat generated in the premix by the mixer raises the temperature of the premix to 35°C. to inhibit coagulation while the pump 22 and agitator 12 shear the partially polymerized furfuryl alcohol and thereby reduce the viscosity thereof. Three thousand and eight grams of this homogeneous premix is transferred to a container where 1,994 grams of tolylene diisocyanate is combined with the premix and blended for 30-60 seconds. During this transfer the premix was passed through the water-cooled heat exchanger 14 and cooled to a temperature of about 30°C. The blended diisocyanate and premix are quickly (preferably within about 10 seconds) poured into a heated metal mold (about 55°C.) whereupon foaming commences and is permitted to advance to completion, which normally requires about 1 hour. After the foamed body is formed, it is carbonized in a manner described in detail in assignee's aforementioned patent application.

It will be seen that by practicing the present invention carbon foam structures are more uniformly reproducible. The process conditions pertaining to the premix operation remain constant, with the premix being maintained at a uniform temperature, density, and viscosity during the storage thereof. The size and number of the undesirable elongated cells in the finished carbon body are significantly decreased. Also, the blended premix provides additional homogeneity of the chemical components and provides a standardized process instead of five separate measurements and a mixing for each casting batch as previously required. The process simplification obtained by the use of a multi-batch premixing operation permits large savings in time, operations, and manpower. The reason for defects in the finished carbon body is easier to locate and the number of defective carbon bodies has been significantly reduced.

As various changes may be made in the method of mixing the foam ingredients and the heating of the ingredients to the desired temperature range without departing from the spirit and scope of the invention and without sacrificing any of its advantages, it is to be understood that all matter herein is to be interpreted as illustrative and not in a limiting sense.

What is claimed is:

1. In the art of preparing a cellular carbonaceous product comprising the steps of admixing partially polymerized furfuryl alcohol containing less than 12 mole per cent of the alcohol monomer and possessing a viscosity in the range of about 10,000 to 14,000 centipoise with water and urethane compounds capable of interacting to form a cellular urethane structure and consisting essentially of a polyhydric alcohol and diisocyanate, forming a cellular urethane structure by the interaction of the urethane compounds, heating the cellular urethane structure to a temperature below the decomposition temperature of the urethane and sufficient to cure the furfuryl alcohol, and thereafter heating the cellular structure to a temperature greater than the decomposition temperature of the urethane and sufficient to carbonize the furfuryl alcohol for forming the cellular carbonaceous product; the improvement consisting of forming a homogeneous premix of the partially polymerized furfuryl alcohol, water and polyhydric alcohol by the steps of combining the partially polymerized furfuryl alcohol, water and polyhydric alcohol, agitating the combined ingredients for homogeneously mixing the latter while simultaneously shearing the partially polymerized furfuryl alcohol for reducing the viscosity of the partially polymerized furfuryl alcohol to a viscosity in the range of 4,000 to 6,000 centipoise and for heating the mixture to a temperature of at least about 35°C. to inhibit coagulation in the premix due to a reaction between the water and the polyhydric alcohol, continuing said agitation and said shearing to maintain the partially polymerized furfuryl alcohol at a viscosity in the last mentioned range and to continually add heat to the premix, circulating premix in a heat exchange relationship with a coolant for maintaining the premix at said temperature of at least about 35°C., removing a portion of the homogeneous premix, and adding the diisocyanate to said portion for forming said cellular urethane structure by the interaction of the urethane compounds.

2. In the art of preparing a cellular carbonaceous product as claimed in claim 1, wherein said temperature of at least about 35°C. is a temperature in the range of about 35° to 40°C.

3. In the art of preparing a cellular carbonaceous product as claimed in claim 2, including the additional step of cooling said portion of the premix to a temperature in the range of about 25° to 35°C. just prior to the addition of the diisocyanate thereto.

* * * * *